United States Patent
Weirup

(10) Patent No.: US 7,726,718 B2
(45) Date of Patent: Jun. 1, 2010

(54) STRUCTURAL SUPPORT FOR A BOLT COLLAR

(75) Inventor: Jamison Weirup, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 11/935,665

(22) Filed: Nov. 6, 2007

(65) Prior Publication Data

US 2009/0115224 A1     May 7, 2009

(51) Int. Cl.
    *B62D 27/00*     (2006.01)
(52) U.S. Cl. .......................................... 296/30; 296/29
(58) Field of Classification Search .................. 296/30, 296/29, 183.1; 280/781
    See application file for complete search history.

(56) References Cited

U.S. PATENT DOCUMENTS

| | | | | |
|---|---|---|---|---|
| 4,456,206 | A * | 6/1984 | Tijssen | 244/118.5 |
| 4,531,761 | A * | 7/1985 | von Sivers | 280/785 |
| 4,562,898 | A * | 1/1986 | Huang | 180/292 |
| 5,306,091 | A * | 4/1994 | Zaydel et al. | 411/175 |
| 5,388,885 | A | 2/1995 | Warren | |
| 5,609,386 | A * | 3/1997 | Takahashi et al. | 296/30 |
| 5,941,597 | A | 8/1999 | Horiuchi et al. | |
| 6,003,898 | A | 12/1999 | Teply et al. | |
| 6,099,039 | A | 8/2000 | Hine | |
| 6,109,653 | A | 8/2000 | Maruyama et al. | |
| 6,116,680 | A | 9/2000 | Hunter et al. | |
| 6,123,378 | A | 9/2000 | Teply et al. | |
| 6,139,094 | A | 10/2000 | Teply et al. | |
| 6,237,304 | B1 * | 5/2001 | Wycech | 296/30 |
| 6,349,953 | B1 * | 2/2002 | Yoshihira et al. | 296/204 |
| 6,375,221 | B1 | 4/2002 | Kudou | |
| 6,676,183 | B2 | 1/2004 | Yoshida et al. | |
| 6,698,809 | B2 | 3/2004 | Stol et al. | |
| 6,736,449 | B2 * | 5/2004 | Takahashi et al. | 296/203.02 |
| 6,877,754 | B2 | 4/2005 | Kim | |
| 6,997,276 | B2 | 2/2006 | Yoshida et al. | |
| 7,021,703 | B2 * | 4/2006 | Yamaguchi et al. | 296/203.04 |
| 7,178,861 | B2 * | 2/2007 | Yamada et al. | 296/204 |
| 2005/0264042 | A1 | 12/2005 | Abe et al. | |
| 2008/0296817 | A1 * | 12/2008 | Shand et al. | 280/781 |

* cited by examiner

*Primary Examiner*—Kiran B. Patel
(74) *Attorney, Agent, or Firm*—Mark E. Duell; Rankin, Hill & Clark LLP

(57) ABSTRACT

A structural support for a bolt collar in an automotive vehicle main structural support is provided and includes a rear wall having a rounded portion, a pair of side walls extending substantially perpendicular from the rear wall and a base extending from a lower portion of the rear wall and from a lower portion of the rounded portion in a direction opposite to that of the pair of side walls. The rounded portion extends outwardly from the rear wall in the same direction as the base in an arc-like fashion and forms a recess on an inside surface of the rear wall. Further, the rounded portion extends approximately halfway up the rear wall from the base.

7 Claims, 3 Drawing Sheets

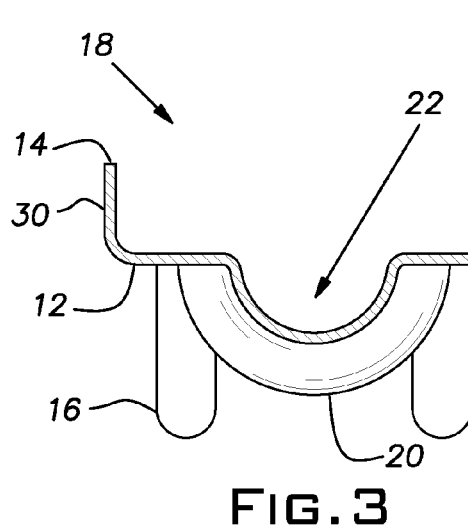
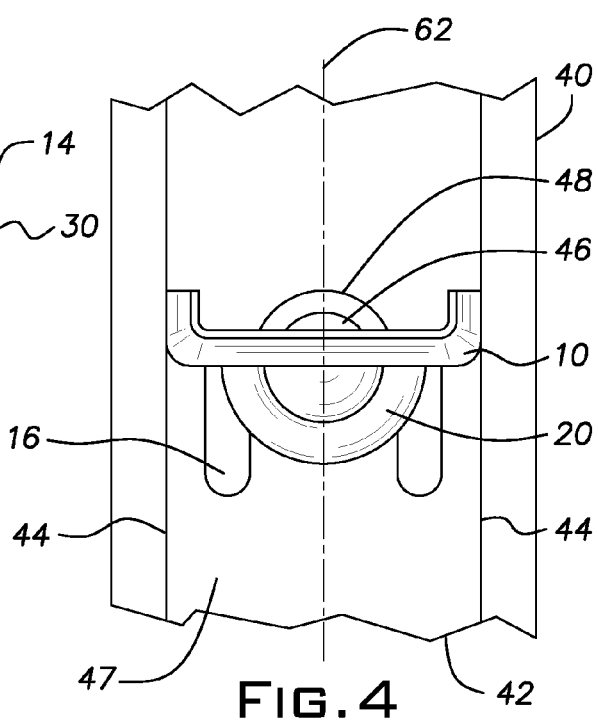
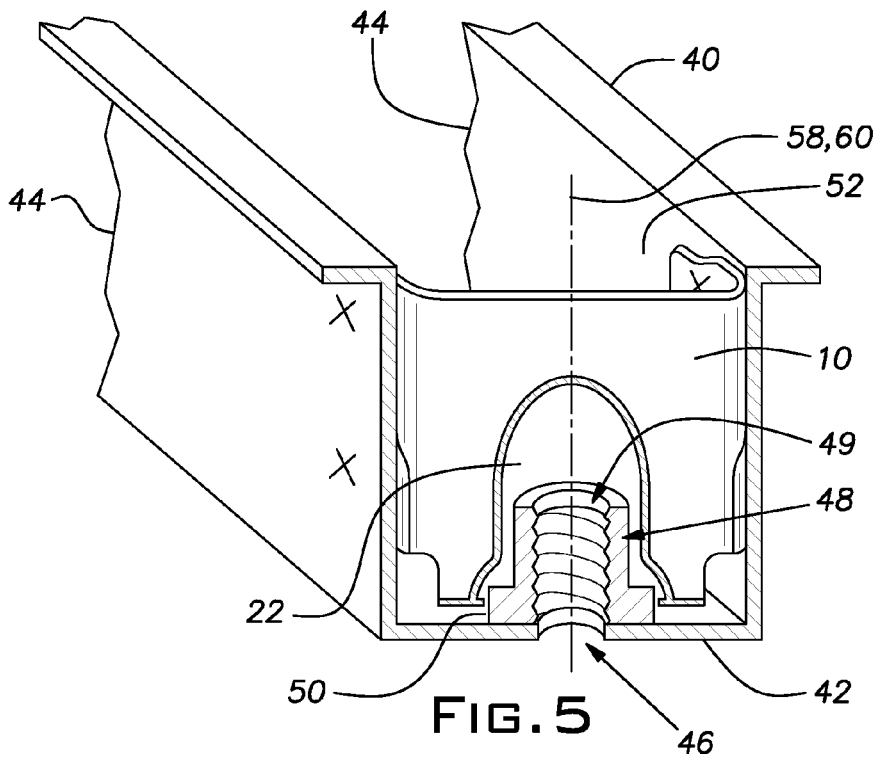

STRUCTURAL SUPPORT FOR A BOLT COLLAR

BACKGROUND OF THE INVENTION

1. Field of the Invention

The present invention relates to connection points between a main structural component, such as a main frame, in an automotive vehicle and a sub-assembly, such as a sub-frame, bumper beam, steering hanger beam, etc. More specifically, the invention relates to a bolt collar and a structural support arrangement on the main structural component.

2. Description of Related Art

Referring to FIG. 7, load transfers between a main structural component 100, such as a main vehicle frame, and a sub-assembly (not shown), such as a sub-frame, bumper beam, etc., in an automotive vehicle occur at connection points through the bolts connecting the sub-assembly to the main structural component 100. To strengthen the connection points a structural support or stiffener 104 can be added to the main structural component 100 to strengthen a bolt collar 106. The stiffener 104 is welded (designated by an "x") to the main structural component 100 and then the bolt collar 106 is welded to both the stiffener 104 and to the main structural component 100 such that a longitudinal axis 108 of the stiffener 104 is perpendicular to the longitudinal axis 110 of the bolt collar 106. This conventional method, however, tends to result in high bending stress around a weld interface 112 between the bolt collar 106, main structural component 100 and stiffener 104, which in turn leads to stress cracks.

Thus, what is required is an improved stiffener that overcomes the above disadvantage.

SUMMARY OF THE INVENTION

In accordance with one aspect, the present invention overcomes the above mentioned disadvantages by providing an automotive vehicle main structural component comprising a frame having a bottom wall, two side walls and an opening defined in the bottom wall, a bolt collar adapted to receive a fastening device operatively connected to an upper surface of the bottom wall such that an opening defined in the bolt collar is aligned with the opening defined in the bottom wall of the frame and a structural support operatively connected to the frame and to the bolt collar, where a longitudinal axis of the structural support is generally parallel to a longitudinal axis of the bolt collar and substantially perpendicular to a longitudinal axis of the frame.

In accordance with another aspect, the present invention provides where the structural support includes a rear wall having a rounded portion, a pair of side walls extending substantially perpendicular from the rear wall and a base extending from a lower portion of the rear wall and from a lower portion of the rounded portion in a direction opposite to that of the pair of side walls where the rounded portion extends outwardly from the rear wall in the same direction as the base in an arc-like fashion thereby forming a recess on an inside surface of the rear wall and where the rounded portion extends approximately halfway up the rear wall from the base.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 3 is a cross section view taken along line 3-3 from FIG. 2.

FIG. 4 is a top view showing the stiffener attached to a main structural component.

FIG. 5 is a perspective cutaway view of the stiffener attached to the main structural component and bolt collar.

DETAILED DESCRIPTION OF THE INVENTION

Figure 1:
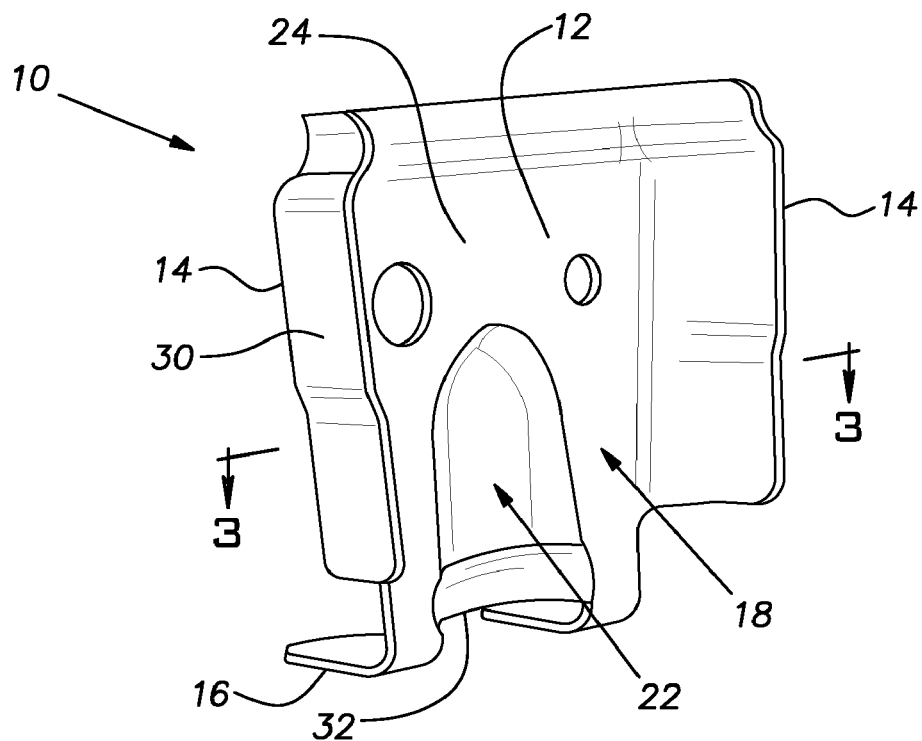
FIG. 1 is a perspective view of the front of a stiffener in accordance with the present invention.
Figure 2:
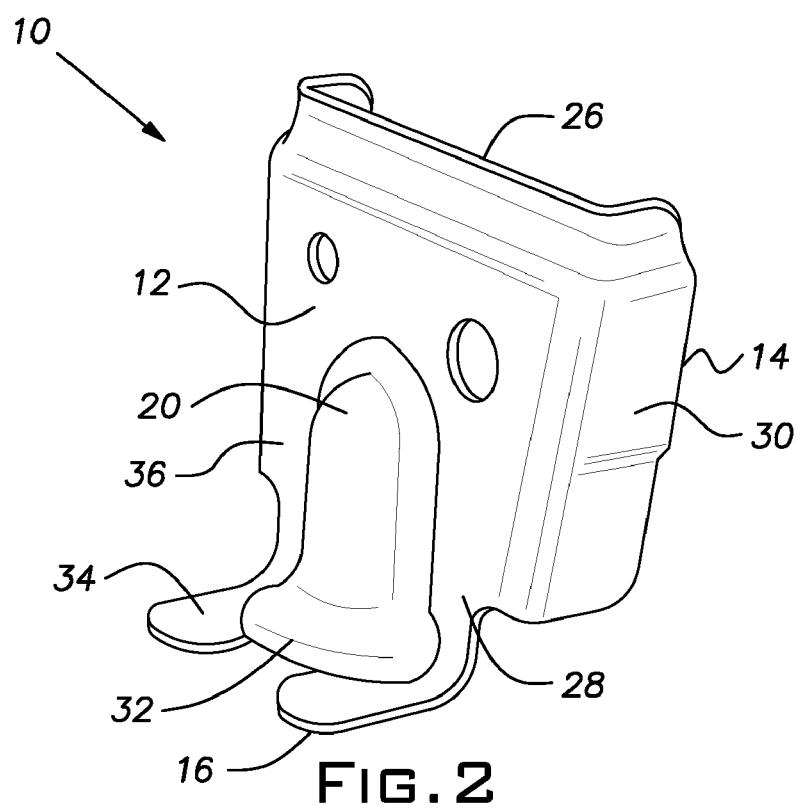
FIG. 2 is perspective view of the rear of the stiffener in accordance with the present invention.

Referring now to the drawings, FIGS. 1 and 2 show perspective front and rear views respectively of a structural support or stiffener 10 for a bolt collar in accordance with the present invention. The stiffener 10 is an integrated part that includes a rear wall 12, two side walls 14 and a base 16. A front portion 18 of the stiffener 10 is open, thus, integration of the rear wall 12 and the two side walls 14 form a U-shaped cross-section (see FIG. 3) as viewed from line 3-3 in FIG. 2.

The rear wall 12 includes a rounded portion 20 that projects outwardly in an arc-like fashion in a direction away from the front portion 18 of the stiffener 10. Thus, the rounded portion 20 forms a recess 22 on an inside surface 24 of the rear wall 12. The rounded portion 20 extends upwardly from the base 16 to approximately halfway up the rear wall 12 and is adapted to receive the bolt collar, as will be explained below. A width of the rear wall 12 increases as the rear wall 12 extends further upward away from the base 16. In other words, a width of a top portion 26 of the rear wall 12 is greater than a width of a lower portion 28.

Still referring to FIGS. 1 and 2, the two side walls 14 extend outward from the rear wall 12 and are substantially perpendicular to the rear wall 12. An outside surface 30 of each side wall 14 is welded to a main structural component to secure the stiffener 10 in place, as will be explained further below.

The base 16 extends outwardly from the lower portion 28 of the rear wall 12 and from a lower portion 32 of the rounded portion 20 such that an upper surface 34 of the base 16 is substantially perpendicular to an outside surface 36 of the rear wall 14. The base 16 extends from the rear wall 12 in a direction opposite to that of the two side walls 14 and engages the main structural component to secure the stiffener in place.

Referring to FIGS. 4 and 5, FIGS. 4 and 5 show a top view and a perspective cutaway view respectively of a main structural component 40, such as a main vehicle frame. The main structural component 40 includes a bottom wall 42, two side walls 44, an opening 46 defined in the bottom wall 42 and a bolt collar 48. The side walls 44 extend upwardly from an upper surface 47 of the bottom wall 42 such that the side walls 44 are substantially perpendicular to the bottom wall 42. The bolt collar 48 is cylindrical in shape and defines an opening 49 that extends the entire length of the bolt collar 48. The bolt collar 48 is connected to the upper surface 47 of the bottom wall 42 such that the opening 49 of the bolt collar 48 is aligned with the opening 46 defined in the bottom wall 42 of the main structural component 40. The bolt collar 48 can be connected to the upper surface 47 of the bottom wall 42 by any means known in the art such as, but not limited to welding. Thus, a connection interface 50 such as a weld interface is formed between the bolt collar 48 and the bottom wall 42 of the main structural component 40. The bolt collar 48 is adapted to receive a fastening device, such as a bolt, to secure the sub assembly to the main structural component 40.

Figure 6:
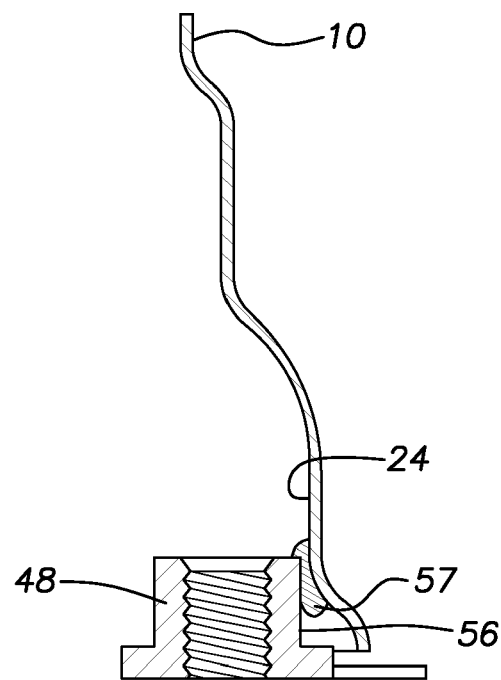
FIG. 6 is a section view of the stiffener showing a weld interface with the bolt collar.
Figure 7:
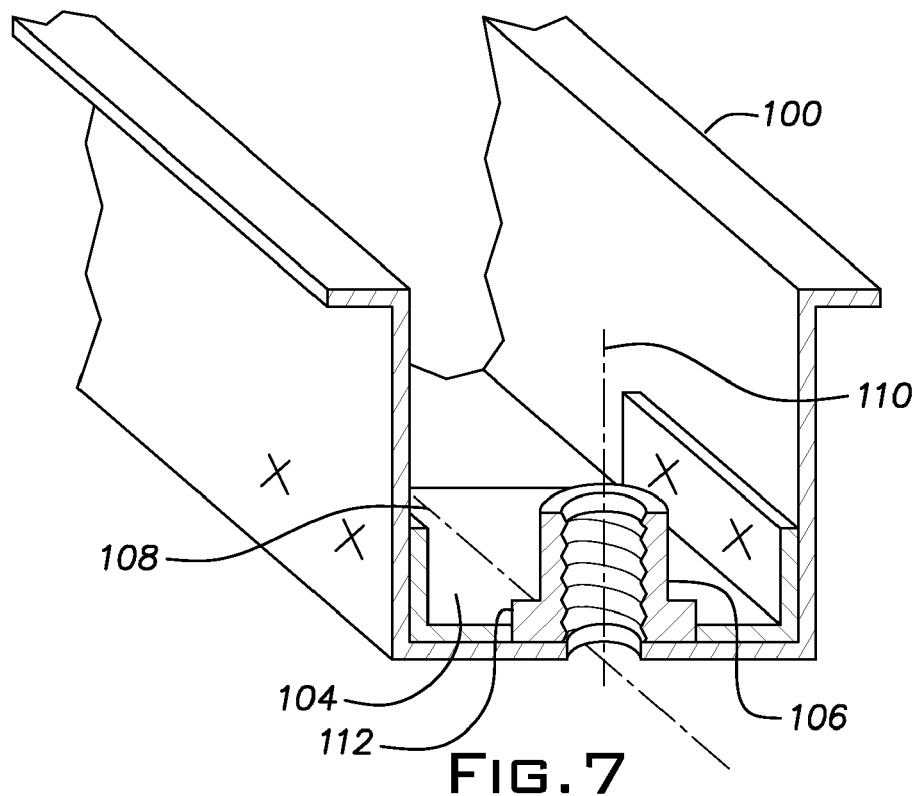
FIG. 7 is a perspective cutaway view of a conventional stiffener attached to a main structural component and bolt collar.

As illustrated in FIG. 5, the outside surface 30 of each side wall 14 of the stiffener 10 is connected to an inside surface 52 of each side wall 44 of the main structural component 40. Further, referring to FIG. 6, the inside surface 24 of the rear wall 12 in the recess 22 is connected to an outside surface 56 of the bolt collar 48 at a connection interface 57. Thus, the stiffener 10 is connected to both the main structural component 40 and to the bolt collar 48. The stiffener 10 can be connected to the main structural component 40 and to the bolt collar 48 by any means known in the art such as, but no limited to welding.

The stiffener 10 is attached to the main structural component 40 such that a longitudinal axis 58 of the stiffener 10 is generally parallel to a longitudinal axis 60 of the bolt collar 48 and substantially perpendicular to a longitudinal axis 62 of the main structural component 40. When the stiffener 10 is attached to the main structural component 40 as described above, the stiffener 10 becomes a stiff tension/compression member that distributes the load in an efficient manner to previously unloaded portions of the main structural component 40. This in turn reduces the deflection of the bolt collar 48 thereby reducing the stress at the connection interface 50 between the bolt collar 48 and the main structural component 40. Thus, the stiffener 10 adds strength and minimizes the deflection to the bolt collar 48.

While specific embodiments of the invention have been described and illustrated, it is to be understood that these embodiments are provided by way of example only and that the invention is not to be construed as being limited but only by proper scope of the following claims.

What is claimed is:

1. An automotive vehicle main structural component comprising:
   a frame having a bottom wall, two side walls and an opening defined in the bottom wall;
   a bolt collar adapted to receive a fastening device operatively connected to an upper surface of the bottom wall such that an opening defined in the bolt collar is aligned with the opening defined in the bottom wall of the frame; and
   a structural support operatively connected to the frame and to the bolt collar,
   wherein a longitudinal axis of the structural support is generally parallel to a longitudinal axis of the bolt collar and substantially perpendicular to a longitudinal axis of the frame.

2. The main structural component of claim 1, wherein the structural support comprises:
   a rear wall having a rounded portion;
   a pair of side walls extending substantially perpendicular from the rear wall; and
   a base extending from a lower portion of the rear wall and from a lower portion of the rounded portion in a direction opposite to that of the pair of side walls.

3. The main structural component of claim 2, wherein the rounded portion extends outwardly from the rear wall in the same direction as the base in an arc-like fashion thereby forming a recess on an inside surface of the rear wall, and
   wherein the rounded portion extends approximately halfway up the rear wall from the base.

4. The main structural component of claim 3, wherein an outside surface of the side walls of the structural support is operatively connected to an inside surface of the side walls of the frame and wherein an inside surface of the rear wall of the structural support is operatively connected to bolt collar.

5. The main structural component of claim 3, wherein a width of a top portion of the rear wall is greater than a width of a lower portion of the rear wall.

6. The main structural component of claim 5, wherein an upper surface of the base is substantially perpendicular to an outside surface of the rear wall.

7. The main structural component of claim 6, wherein the integration of the rear wall and the pair of side walls form a U-shaped cross-section.

* * * * *